United States Patent
Hall et al.

(10) Patent No.: US 8,024,807 B2
(45) Date of Patent: *Sep. 20, 2011

(54) PROBABILISTIC MECHANISM TO DETERMINE LEVEL OF SECURITY FOR A SOFTWARE PACKAGE

(75) Inventors: Kylene Jo Hall, Austin, TX (US);
Dustin C. Kirkland, Austin, TX (US);
Emily Jane Ratliff, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 12/130,318

(22) Filed: May 30, 2008

(65) Prior Publication Data
US 2008/0229423 A1    Sep. 18, 2008

Related U.S. Application Data

(63) Continuation of application No. 10/870,540, filed on Jun. 17, 2004, now Pat. No. 7,487,545.

(51) Int. Cl.
*G06F 9/44* (2006.01)
*G06F 11/00* (2006.01)
*G06F 12/14* (2006.01)

(52) U.S. Cl. ............ 726/25; 726/22; 714/38; 717/124; 717/125; 717/126; 717/127; 717/128; 717/129; 717/130; 717/131; 717/132; 717/133; 717/134; 717/135

(58) Field of Classification Search ................. None
See application file for complete search history.

(56) References Cited

U.S. PATENT DOCUMENTS

| 6,219,805 | B1 * | 4/2001 | Jones et al. | 714/38 |
| 7,257,630 | B2 * | 8/2007 | Cole et al. | 709/224 |
| 2005/0283622 | A1 | 12/2005 | Hall et al. | |

* cited by examiner

*Primary Examiner* — Kaveh Abrishamkar
(74) *Attorney, Agent, or Firm* — Okamoto & Benedicto LLP

(57) ABSTRACT

A mechanism for determining a probabilistic security score for a software package is provided. The mechanism calculates a raw numerical score that is probabilistically linked to how many security vulnerabilities are present in the source code. The score may then be used to assign a security rating that can be used in either absolute form or comparative form. The mechanism uses a source code analysis tool to determine a number of critical vulnerabilities, a number of serious vulnerabilities, and a number of inconsequential vulnerabilities. The mechanism may then determine a score based on the numbers of vulnerabilities and the number of lines of code.

2 Claims, 4 Drawing Sheets

FIG. 4A
```
// Insecure.c
// This program contains a vulnerability on almost every line
#include <stdio.h>
int main(int argc, char *argv [])
{
        char overflow[4];

strcpy (overflow, argv[0]);
        strcat (overflow, argv[1]);
        printf (overflow);
        return 0;
}
```

FIG. 4B
```
# rats insecure.c
insecure.c:4: High: fixed size local buffer
Extra care should be taken to ensure that character arrays that
are allocated on the stack are used safely.  They are prime
targets for buffer overflow attacks.

insecure.c:6: High: strcpy
Check to be sure that argument 2 passed to this function call
will not more data than can be handled, resulting in a buffer
overflow.

insecure.c:8: High: printf
Check to be sure that the non-constant format string passed as
argument 1 to this function call does not come from an untrusted
source that could have added formatting characters that the code
is not prepared to handle.
```

PROBABILISTIC MECHANISM TO DETERMINE LEVEL OF SECURITY FOR A SOFTWARE PACKAGE

CROSS REFERENCE TO RELATED APPLICATIONS

The present invention is related to an application entitled SYSTEM FOR MANAGING SECURITY INDEX SCORES, U.S. application Ser. No. 10/870,529, filed even date hereof, assigned to the same assignee, and incorporated herein by reference.

This application is a continuation of application Ser. No. 10/870,540, filed Jun. 17, 2004, status pending.

BACKGROUND OF THE INVENTION

1. Technical Field

The present invention relates to data processing and, in particular, to determining security levels for software packages. Still more particularly, the present invention provides a method, apparatus, and program for determining a probabilistic security score for a software package.

2. Description of Related Art

Security vulnerabilities are an increasing source of concern for business users and normal end users. Estimated costs due to recent viruses approach into the billions of dollars. Solutions to security problems range from administrative to technical, detective to reactive. One class of security solutions includes methods to encourage developers to write more secure code. Attacks may originate in the network layer or the system layer; however, many attacks may originate in the application layer. Thus, software developers may use the security of their code as a selling point for their products. Even in the open source community, the reputation of a developer is very important, particularly with respect to the security of the code produced by the developer.

Even well written code will likely include some bugs or security vulnerabilities. It is a significant goal of software developers to minimize these security vulnerabilities whenever possible. Several tools exist that may be used to analyze code to identify security vulnerabilities in program code. The Rough Auditing Tool for Security (RATS) is one such analysis tool that, as its name suggests, performs a rough analysis of source code. As another example, Flawfinder is a program that examines source code and reports possible security weaknesses sorted by risk level. These tools are very useful for quickly finding and removing at least some potential security problems before a program is widely released to the public. A current problem with the known solutions is that developers rarely use the existing tools and the information delivered by the tools is not readily accessible to non-developers.

SUMMARY OF THE INVENTION

The present invention recognizes the disadvantages of the prior art and provides a mechanism for determining a probabilistic security score for a software package. In one preferred embodiment, the present invention calculates a raw numerical score that is probabilistically linked to how many security vulnerabilities are present in the source code. The score may then be used to assign a security rating that can be used in either absolute form or comparative form. The mechanism of the present invention uses a source code analysis tool to determine a number of critical vulnerabilities, a number of serious vulnerabilities, and a number of inconsequential vulnerabilities. The mechanism may then determine a score based on the numbers of vulnerabilities and the number of lines of code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B depict an example portion of source code and corresponding output from a source code analysis tool to help illustrate the exemplary aspects of the present invention.

DETAILED DESCRIPTION OF THE PREFERRED EMBODIMENT

Figure 1:
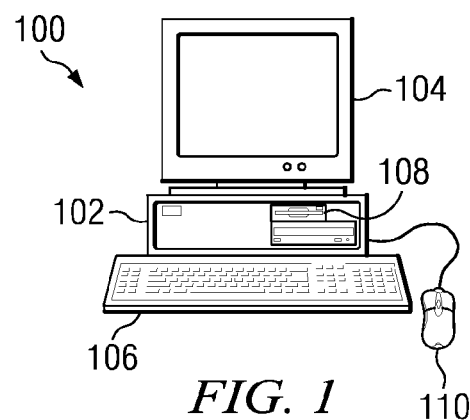
FIG. 1 is a pictorial representation of a data processing system in which the present invention may be implemented in accordance with a preferred embodiment of the present invention.
Figure 2:
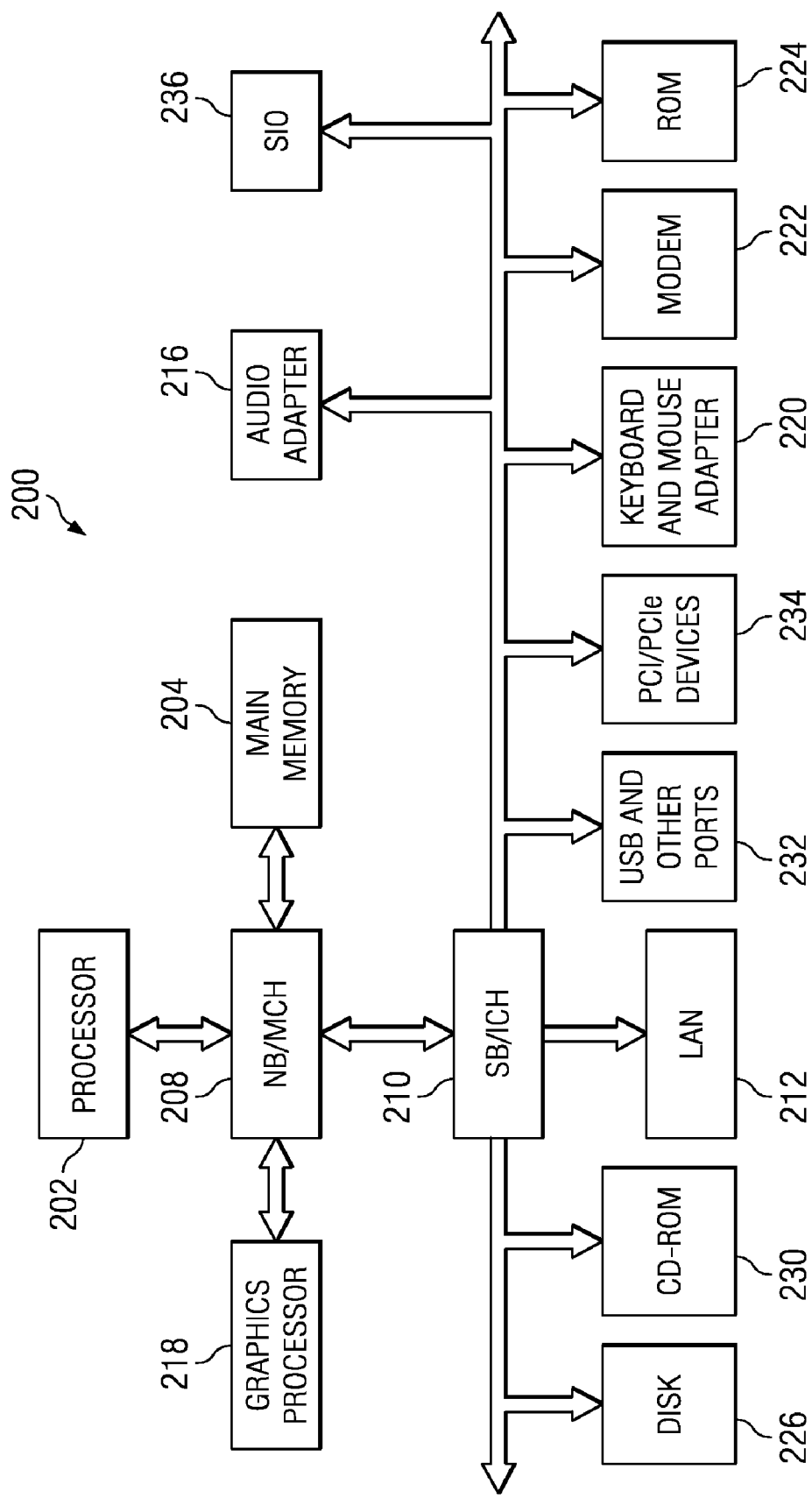
FIG. 2 is a block diagram of a data processing system in which the present invention may be implemented.

The present invention provides a method, apparatus and computer program product for determining a probabilistic security score for a software package. The data processing device may be a stand-alone computing device or may be a distributed data processing system in which multiple computing devices are utilized to perform various aspects of the present invention. The following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer.

Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer, laptop computer, or telephone device in addition to taking the form of a PDA.

In accordance with a preferred embodiment of the present invention, a mechanism for determining a probabilistic security score for a software package is provided. In one preferred embodiment, the present invention calculates a raw numerical score that is probabilistically linked to how many security vulnerabilities are present in the source code. This security score is a software quality metric with respect to security as a quantitative value. The score may then be used to assign a security rating that can be used in either absolute form or comparative form. The mechanism of the present invention uses a source code analysis tool to determine a number of critical vulnerabilities, a number of serious vulnerabilities, and a number of inconsequential vulnerabilities. The mechanism may then determine a score based on the numbers of vulnerabilities and the number of lines of code.

Figure 3:
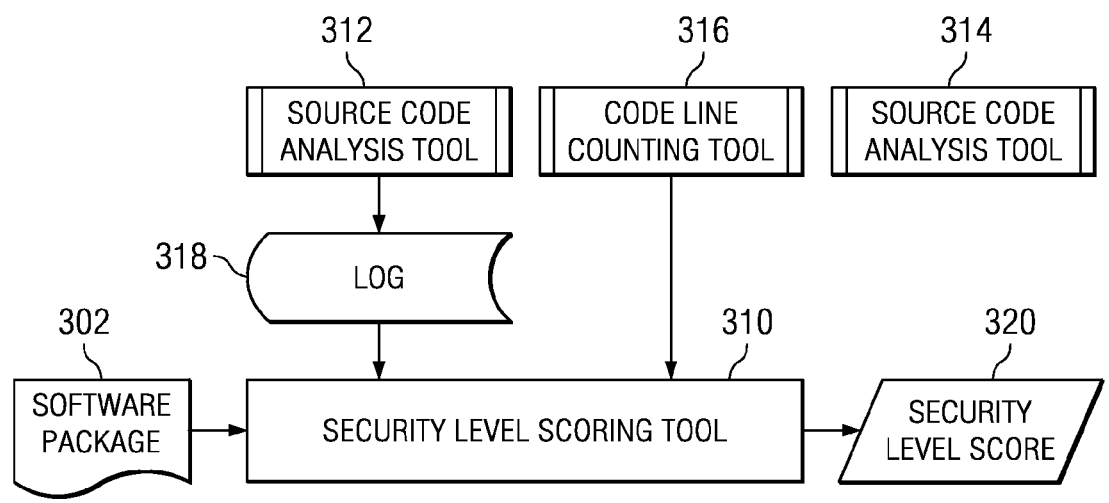
FIG. 3 is a block diagram illustrating a security analysis and scoring tool in accordance with an exemplary embodiment of the present invention.

FIG. 3 is a block diagram illustrating a security analysis and scoring tool in accordance with an exemplary embodiment of the present invention. Security level scoring tool 310 receives software package 302 for analysis. Security level scoring tool 310 uses one or more source code analysis tools, such as tools 312, 314, to provide the input that is used to calculate the score. Security level scoring tool 310 then provides a concrete score that can be used to easily gauge the security of a package and help establish a level of confidence.

Examples of existing source code analysis tools include Rough Auditing Tool for Security (RATS) and Flawfinder. These tools are very useful for quickly identifying at least some potential security problems before a program is widely released to the public. Other existing or specialized source code analysis tools may be used within the scope of the present invention. For example, security level scoring tool 310 may include a default source code analysis tool for identifying security vulnerabilities.

Security level scoring tool 310 allows a user to plug-in any source code analysis tool by specifying a path and tags for the tool. The vulnerability scanning tool, such as one of source code analysis tools 312, 314, is then executed and instances of the tags are counted. The tags are used to parse a log or output, such as log 318, of the vulnerability scanning tool for instances of critical, serious, and/or inconsequential vulnerabilities. The instances of the tag are then weighted accordingly.

Security level scoring tool may then determine security level score 320 based on the numbers of vulnerabilities and the number of lines of code. The security level score 320 may then be presented using an output device, such as display 104 in FIG. 1, for example. An existing line-of-code counting tool, such as code line counting tool 316, may be used to determine the number of lines of code. An example of an existing line-of-code counting tool is SLOCCount, which is set of tools for counting physical source lines of code (SLOC) in a large number of languages of a potentially large set of programs.

It should be noted that source code analysis tools are not perfect. For example, many existing source code analysis tools will often flag a secure usage of a historically insecure application program interface (API), such as "sprintf." Thus, source code that uses historically insecure APIs may receive a lower rating than is justified by the number of vulnerabilities in the code. This penalty is justified by the fact that there is a higher probability that a vulnerability will be introduced through future code changes than if safer calls were being used.

In one preferred embodiment of the present invention, the algorithm to determine a security level score is as follows:

$$\text{score} = 100 - (100 * (((h*hw) + (m*mw) + l)/loc))[\text{floor} = 0]$$

where:
- h=number of vulnerabilities with a high or critical rating;
- hw=weight of critical vulnerabilities;
- m=number of vulnerabilities with a medium or serious rating;
- mw=weight of medium vulnerabilities;
- l=number of vulnerabilities with a low or inconsequential rating;
- loc=number of lines of code.

The above equation is illustrates an exemplary embodiment of the present invention. The actual algorithm, equation, or formula for determining the security level score may change depending upon the implementation. For example, the equation may use more or fewer levels of security vulnerabilities. As another example, the security level score may be normalized to be a value between zero and one, rather than a percentage score.

It should be noted that security level scoring tool 310 may use more than one tool for determining a security score. For example, security level scoring tool 310 may use a first source code analysis tool to identify critical vulnerabilities and a second source code analysis tool to identify inconsequential or low-level vulnerabilities. Security level scoring tool 310 may then correlate the output from each source code analysis tool to determine a final weight assigned to each vulnerability. The final severity, or weight, of a vulnerability may be determined based on the reputation of the source code analysis tool that reported it, the severity that the tool reported, and the number of the tools that reported the vulnerability.

FIGS. 4A and 4B depict an example portion of source code and corresponding output from a source code analysis tool to help illustrate the exemplary aspects of the present invention. More specifically, the portion of program code, insecure.c, shown in FIG. 4A results in the log output shown in FIG. 4B when analyzed by a source code analysis tool. As illustrated in FIG. 4B, the source code analysis tool identifies three security vulnerabilities with a high rating, no vulnerabilities with a medium rating, and no vulnerabilities with a low rating. Also note that there are nine lines of code.

The security level score for insecure.c is calculated as follows:

$$100-(100-(100*((3*3)+(0*2)+0)/9))=0$$

where, in this example, the weight associated with a high level vulnerability is 3, the weight associated with a medium level vulnerability is 2, and the weight associated with a low level vulnerability is 1. A score of zero indicates that there is a likely security vulnerability in every line of source code.

Fixing just one of the vulnerabilities results in the following score:

$$100-(100*((2*3)/9))=33$$

Thus, fixing one high level vulnerability in the depicted example increases the score to 33, which indicates that there is likely a security vulnerability in two out of every three lines of code. The weighting factors illustrated above are arbitrary. Satisfactory weights may be determined by experimentation.

As noted above, the security level scoring tool of the present invention relies on the source code analysis tools to identify security vulnerabilities. Therefore, depending upon the source code analysis tool used, particular vulnerabilities, such as vulnerabilities introduced by logic flaws, may go undetected. Thus, a software package with a score of 100 may still be vulnerable. However, the score gives a good indication of a likelihood of vulnerabilities existing in the code nonetheless.

Figure 5:
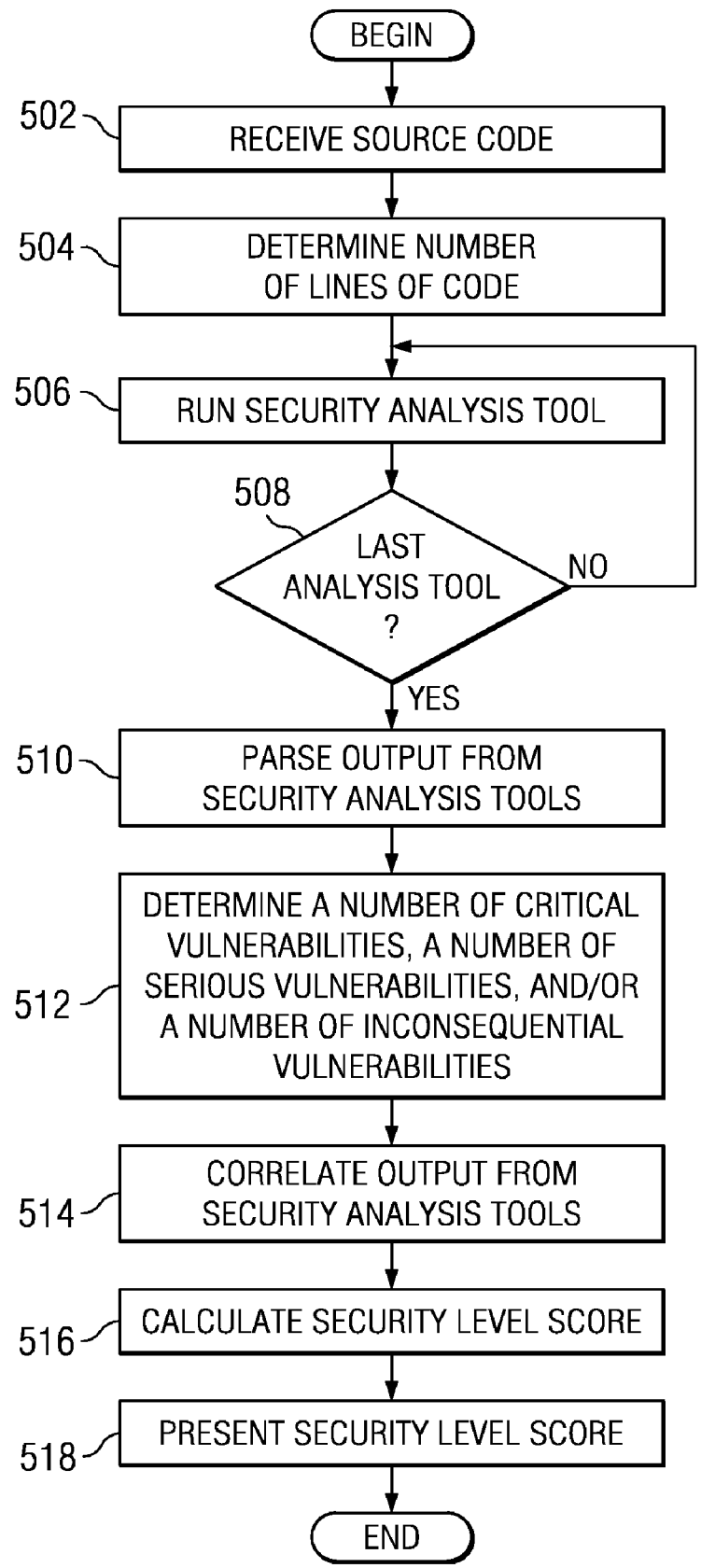
FIG. 5 is a flowchart illustrating the operation of a security level scoring mechanism in accordance with an exemplary embodiment of the present invention.

FIG. 5 is a flowchart illustrating the operation of a security level scoring mechanism in accordance with an exemplary embodiment of the present invention. Operation begins and the security level scoring mechanism receives source code to analyze (block 502). Then, the mechanism determines a number of lines of code (block 504) and runs a security analysis tool (block 506).

Next, a determination is made as to whether the security analysis tool run in block 506 is the last analysis tool to run (block 508). If the security analysis tool is not the last tool, operation returns to block 506 to run the next tool. If the security analysis tool is the last tool in block 508, operation continues to block 510 where the security level scoring mechanism then parses a log or other output from the security analysis tool.

Thereafter, the security analysis tool determines a number of critical vulnerabilities, a number of serious vulnerabilities, and/or a number of inconsequential vulnerabilities (block 512). Next, the security level scoring mechanism correlates the output from the security analysis tools (block 514) and calculates a security level score based on the numbers of vulnerabilities, weighted by level, and the number of lines of code (block 516). Weights may be assigned to vulnerabilities in the calculation of block 516 based on the correlation performed in block 514. Then, the mechanism presents the security level score (block 518) and operation ends.

Thus, the present invention solves the disadvantages of the prior art by providing a mechanism or tool for determining a concrete score for the security of program code. The security score is a software quality metric with respect to security as a quantitative value. The score may be used to assign a security rating that can be in absolute form. For example, a score of 90 to 100 gets an "A," a score of 80 to 89 gets a "B," and so on. The security rating may also be presented in comparative form. For example, a software package with a score of 87 is probably more secure than a package with a score of 45, or at least exhibits fewer security vulnerabilities. As another example, a software package may have a score of 87, but be in the $79^{th}$ percentile, meaning it is probably more secure than 79% of other software packages in the same field.

A key use of this tool may be to provide a source of peer pressure to encourage developers to "clean up" their code. For example, a developer that receives a low score on her code may be motivated not to use historically insecure APIs. Furthermore, the security level scoring tool of the present invention provides insight into which software packages would benefit from enhanced security review or which software packages are more suited for purchase or use. The tool may also be used to gauge the effectiveness of source code scanning tools by comparing the scores that are generated by the same code using various different plug-ins.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer comprising:
    a processor;
    a memory comprising instructions to receive a portion of software code for analysis, to determine a number of security vulnerabilities for the portion of software code, to determine a security level for the portion of software code based on a number of vulnerabilities with a critical rating found in the portion of software code, a number of vulnerabilities with a serious rating found in the portion of software code, a number of vulnerabilities with a low or inconsequential rating found in the portion of software code, and a number of total lines of code in the portion of software code, wherein the security level is probabilistically linked to the number of vulnerabilities, and wherein the memory comprises instructions to determine the security level for the portion of software code by calculating a security level score using the following equation:

$$\text{score}=100-(100*(((h*hw)+(m*mw)+l)/loc))[\text{floor}=0]$$

where h is the number of vulnerabilities with a critical rating found in the portion of software code, hw is the weight for critical vulnerabilities, m is the number of vulnerabilities with a serious rating found in the portion of software code, mw is a weight for serious vulnerabilities, l is the number of vulnerabilities with a low or inconsequential rating found in the portion of software code, and loc is the number of total lines of code in the portion of software code; and
    a display device to display the security level;
    wherein the instructions to determine the number of security vulnerabilities of the portion of software code comprise instructions to receive one or more output logs from one or more source code analysis tools, to parse the one or more output logs for a tag, and to identify each instance of the tag in the one or more output logs as a security vulnerability.

2. The computer of claim 1 wherein the memory further comprises instructions to correlate the one or more output logs.

* * * * *